United States Patent [19]

Williams

[11] Patent Number: 4,970,971
[45] Date of Patent: Nov. 20, 1990

[54] SYSTEM OF AND APPARATUS FOR SANITIZING WASTE MATERIAL

[76] Inventor: Robert M. Williams, 16 La Hacienda, Ladue, Mo. 63124

[21] Appl. No.: 420,383

[22] Filed: Oct. 12, 1989

[51] Int. Cl.$^5$ .............................................. F23B 7/00
[52] U.S. Cl. .................................. 110/346; 110/106; 110/245
[58] Field of Search ............... 110/219, 220, 224, 229, 110/236, 243, 244, 346, 171

[56] References Cited

U.S. PATENT DOCUMENTS

| | | | |
|---|---|---|---|
| 4,059,060 | 11/1977 | Gambs et al. | 110/106 |
| 4,310,299 | 1/1982 | Binasik et al. | 110/106 |
| 4,776,288 | 10/1988 | Beisswenger et al. | 110/245 |
| 4,848,249 | 7/1989 | LePori et al. | 110/346 |

*Primary Examiner*—Henry C. Yuen
*Attorney, Agent, or Firm*—Gravely, Lieder & Woodruff

[57] ABSTRACT

A method for disposing by incineration of oil contaminated waste material after removal of solids of various kinds by performing multiple steps in its handling wherein the composite material is first subjected to a first classification step for extracting a high percentage of contaminant free material. After subjecting the material to a second classification cyclone where the gases that are used to transport the ground matter can be separated while the solids are subjected to classification by the use of a vibratory screen where the paper, fluffy waste, and similar material can be separated from the smaller and harder particulate components. The separated components are subjected to individual impact grinding steps prior to being recombined in the combustor where incineration takes place. The gases separated in the cyclone step for moving the residue of material into an incinerating combustor, and ambient air is delivered to the incinerator for establishing sufficient oxygen to support combustion at a temperature that will sanitize and destroy odors in the waste material and after the sanitizing step in the incinerator, the gases are exhausted through suitable heat exchangers and filtering medium while the residue material is fused at high temperature into stable pellet form.

3 Claims, 1 Drawing Sheet

SYSTEM OF AND APPARATUS FOR SANITIZING WASTE MATERIAL

BACKGROUND OF THE INVENTION

1. Field of the Invention

The present invention is directed to apparatus for and methods of treating soil contaminated with such substances as oil and certain related chemicals.

2. Description of the Prior Art

A particularly difficult problem to solve is how to clean up and sanitize soil that has been contaminated by oil spills and related materials that easily contaminate but are difficult to dislodge or separate from the soil and render the soil unacceptable for further use.

Presently known examples of apparatus for and methods of decontaminating soil that has been contaminated by impurities are found in 4,402,274 of Sept. 3, 1983; 4,685,220 of Aug. 11, 1987; and 4,699,721 of Oct. 13, 1987. In these examples it is apparent that complicated apparatus has evolved at some expense, and the methods developed by such apparatus requires many steps to complete.

Other examples of apparatus that have evolved to process contaminated soil material are represented by 4,593,477 of June 10, 1986; 4,608,944 of Sept. 2 1986; 4,628,838 of Dec. 16, 1986; 4,646,637 of Mar. 3, 1987; and 4,671,251 of June 9, 1987.

BRIEF SUMMARY OF THE INVENTION

The invention herein is directed to a way of subjecting contaminated waste material, such as soil, tar-sand, and the like to steps for releasing the solid content from the material considered to be the contaminant and separately disposing of the solids while burning the contaminating material.

It is recognized that the type of material being treated in the present system must limit the emissions of nitrous oxide since the material being subject to combustion at high temperature can produce nitrogen concentration. Thus, control of exposure to high flame temperature is important.

A primary object of the invention is to very simply and inexpensively separate out and clean solids, such as rock and the like, and pass the contaminating material very quickly through a relatively high temperature combustion phase to sanitize, deodorize and convert the residue from the combustion phase into an ash substance that can be acceptable in land-fill disposal operation.

A further object of the present invention is to treat oil contaminated soil to a first phase which separates any solids that may be present and to convert the remainder of the soil to heat from the phase of burning the oil contaminant so the components in the soil that are capable of being vaporized will be suitably prepared as a fuel for producing the required source for the heat.

Still another object of the present invention is to regulate the temperature and condition of the moisture in the system so that a proportion of the vapor discharged from the combustor can be returned to the initial grinding mill for effecting partial drying of the incoming new material by use of the heated discharge from the combustor to raise the temperature of the combustion supporting ambient air, and a temperature in a final step to a level that will not be destructive of a bag house where the fine particulate and residue matter is extracted while the vapor is returned to the ambient air and is mixed with a supply of air that has been raised in temperature to an oxidizing level for discharge to the ambient atmosphere with the emission from the bag house.

The system also contemplates, as an important object, the combustion of the vaporized material using technique with specific improvements to obtain greater efficiency in using the prepared vaporized material as its own fuel while delaying the delivery to the burner so that nitrous oxide is controlled, thereby effecting disposal by a self preparation technique of burnables to support combustion thereof.

BRIEF DESCRIPTION OF THE DRAWING

The apparatus for carrying out the method of separating out solids from oil contaminant and then treating the remainder in a combustion phase, is illustrated in FIG. 1 which is a schematic diagram.

DETAILED DESCRIPTION OF THE INVENTION

Figure 2:
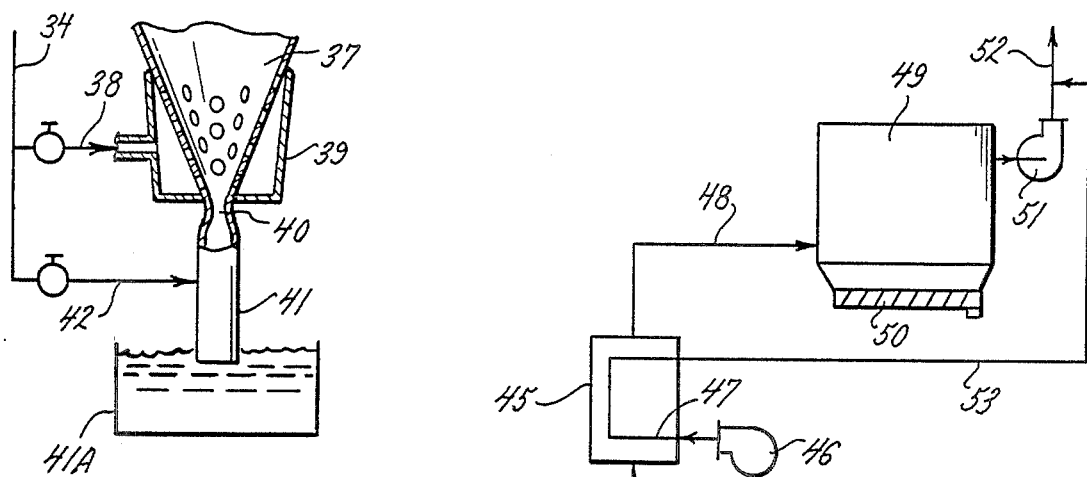
FIG. 2 which is an enlarged and fragmentary part of the apparatus for producing pellets.
Figure 1:
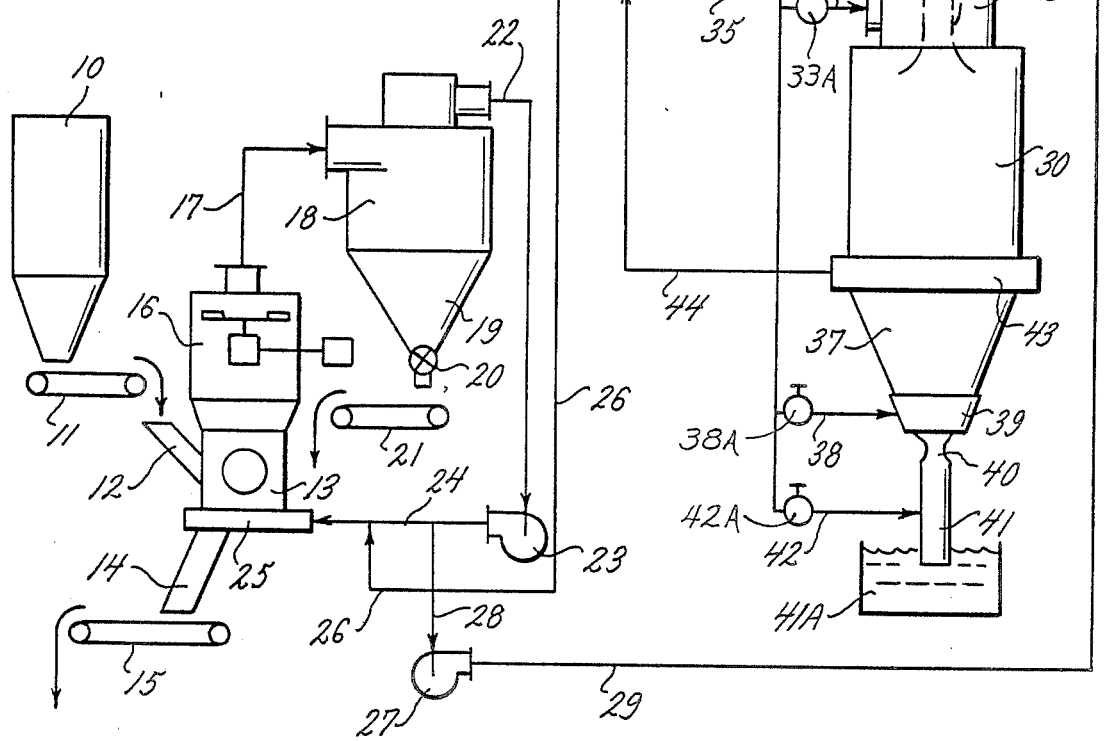

In the schematic diagram, the apparatus may be divided into a first operative phase wherein the material to be subjected to treatment is processed to separate solids from the remainder so that the remainder can be more easily processed in a combustion operation for sanitizing the material.

The first phase in the operation of apparatus comprises a collection bin 10 for the incoming oil contaminated soil and any materials that may be present. That collection is released to a conveyor 11 which deposits it into a chute 12 leading into the grinding chamber of a roller mill 13. The mill processes the material and causes the large hard objects like rock to exit through a chute 14 where it is moved by a conveyor 15 to a point of discharge. The major portion of the material is lifted by air, gases and the like, through a classifier 16 where the larger objects are returned for further grinding. The rest of the material is conducted by conduit 17 to a cyclone separater 18. The cyclone performs the work of retaining small hard material in the bottom cone 19 of the cyclone 18 where it can be released through a rotary gate 20 onto a conveyor 21 for movement to a point of release. The gases, fine material and volatile materials are separated in the cyclone 18 and are conducted by a conduit 22 to a circulating blower 23. The blower 23 has its outlet conduit 24 connected into the windbox 25 for the mill 13.

The blower 23 moves gases, fines and volatile materials in a circuit that comprises the blower outlet 24, the mill 13 classifier 16, and conduit 22 back to the blower. All of the gases, fine and volatile material or substances that are thus circulated are tempered with hot gases introduced by conduit 26 from a second operative phase in the operation of the apparatus. The quantity of materials admitted at conduit 26 to the first operating phase is substantially equal to the quantity of the materials that are drawn out of the conduit 24 by the blower 27 by way of conduit 28 for delivery to conduit 29.

The second operating phase of the apparatus comprises a combustor 30 to which the output conduit 29 from blower 27 is connected to deliver the vaporized gases, fines and entrained material from the first phase. The combustor 30 is provided with a source of outside fuel which is delivered by a conduit 31 under the control of a suitable quantitative type control in housing 32A, the outside fuel consisting of either gas, oil, or powdered coal. The combustor 30 is provided with a burner unit 32 having an internal cone 32B which is perforated for the purpose of admitting preheated outside air supplied by a fan 35 delivering the air through the feed conduit 34 which has a branch 33 provided with a control valve 33A so as to admit as much outside air as is necessary to support combustion in the burner 32. The material delivered by conduit 29 from the first phase of the apparatus is delivered directly into the burner 32 where it passes through the cone 32B and is mixed with preheated outside air to supply the necessary oxygen to support burning. Since the material supplied through conduit 29 has only approximately 5% oxygen, the valve 33A is adjusted so that a portion of the outside air at conduit 33 will mix in the cone 32B to develop the necessary combustion, while the remainder of the outside air will pass around the outside of the cone 32B. The initial stage of combustion occurs at the burner 32, and the fuel/air ratio is controlled accurately to minimize atmospheric nitrogen in the combustion chamber. Mixing of the material supplied from conduit 29 with the fuel from conduit 31 is purposely delayed to spread the heat release over a greater volume, and this delay lowers flame temperature. Since the combustion cone 32B is perforated, as much as 80% of the outside air required for combustion goes through the burner cone, while the balance of the outside air enters the major volume of the combustion chamber which further delays mixing of the combustibles so that nitrogen disassociation is reduced in the hottest part of the flame.

Continuing combustion of the material initally staged at or adjacent the burner 32 is contained in a second stage in the lower region 37 of the combustor 30 by the introduction of outside air supplied through controlled valve 38A in the branch line 38. Finally, there is a third stage which occurs in the discharge tube 41 where outside air is supplied through a control valve 42A in conduit 42. The air supplied at tube 41 is intended to retain the ash generated in the region 37 so that it will fuse and form pellets which increase in size until the weight thereof overcomes the air flow. When the pellets are sufficiently heavy they drop through the tube 41 into the cooling tub 41A.

Continuing on with the construction of the second operating phase of the apparatus, the combustor 30 is provided with a bustle 43 which collects the hot gases generated in the region 37 of the combustor 30 and delivers it by conduit 44 to the heat exchanger 36. Part of the hot gases received by the heat exchanger 36 is delivered by conduit 26 into the first phase of the apparatus at the conduit 24 from the blower 23. The suction effect on conduit 26 produced by the flow through conduit 24 will draw the hot gases from the heat exchanger 36 by way of conduit 26.

The remainder of the apparatus for the second operative phase includes a second heat exchanger 45 associated with a supply of ambient air delivered by blower 46 into conduit 47. The exchanger itself is connected by conduit 48 into a bag house 49 which is well known in the art. The bag house 49 is operative to filter out any residual matter from the gases for collection by a screw conveyor device 50. The cleaned gases are then released to atmosphere through blower 51 at the outlet stack 52. The ambient air flow in the second heat exchanger 45 is delivered through conduit 53 to the outlet stack 52 to mingle with the stack gases.

The operation of the apparatus is such that the function of the first phase is to use the roller mill 13 to reduce the incoming contaminated soil and coarse particles, such as stones, metals, and like trash, prior to being separated out at the bottom discharge 14. The flow of material and gases passing through the classifier 16 is subjected to a further classification where larger material is sorted out and falls back into the mill 13 for further reduction before being Passed into the cyclone separater 18. Solids are extracted and delivered to the conveyor 21, while the gases and volatile material, along with tar-sand and fine solid residue is moved along by blower 23. Part of the circulation caused by blower 23 is removed by the blower 27 for delivery into the second operating phase. What ever quantity that is removed by blower 27 is substantially replaced by hot gases from the second operating phase by way of conduit 26.

When the apparatus is fully operative, hot gases from the combustor 30 enter the first phase by way of conduit 26 and are applied to initiate the vaporization of the oil and other material by elevating the temperature of the circulating medium to a level of the order of about 350° F. That temperature level is obtained from the higher temperature of the order of 1200° F. generated by the combustor 30 when it reaches the conduit 26. The heat generated in the combustor 30 is obtained by the burnable fines and volatiles obtained from the first operating phases of the apparatus by way of conduit 29 from blower 27, and from the fuel admitted to the burner unit 32 from the outside source at conduit 31. The volatile material and entrained fine solids delivered by conduit 29 to the combustor 30 is raised to a temperature level of the order of 2000° F. for a short time period to sanitize and deodorize the material as it moves into the combustion region 37. Thus, the release of the gases at the bustle 43 will have about the same 2000° F. temperature, as the supply of air from the plenum 39 by way of conduit 38 bringing in outside heated air. As seen in this fragmentary detail of FIG. 2, the plenum 39 has a jacket surrounding perforations in the bottom of the region 37 which allows the hot air to bubble up through the ash material that is moving down in region 37 to to supply oxygen to complete residual combustion, and cause a fusing reaction of the ash into pellet form until the pellets reach a weight that allows them to descend by gravity through the venturi 40 and outlet 41 and fall into a cooling tub 41A.

The hot gases reaching the first heat exchanger 36 is divided by the action of blower 23 in the first operating phase and by blower 51 in the second operating phase. Since the heat exchanger 36 received the hottest gases, it will lose some heat to the ambient air pulled in by the blower 35 so that the heat level of the gases at the connection of conduit 26 with conduit 24 will be of the order of about 1200° F. The hot gases which proceed from the first heat exchanger 36 into the second heat exchanger 45 is expected to be at a temperature level of the order of about 1200° F. By passing ambient air by blower 46 through the heat exchanger 45 the exit temperature at conduit 48 will be reduced to a level of the order of 350° F. which is not destructive to the bag house. At the same time the heat imparted to the ambient air moved by blower 46 and exiting in conduit 53 will be at a level of about 1000° F. which is high enough to be useful in the stack 52 to neutralize any residual noxious odors in the gases being released to atmosphere.

In the operation of the apparatus, the material discharged from the mill 13 through chute 14 is substantially free of contaminants due to the incoming heat from conduit 26 vaporizing the matter that would otherwise cause contamination. The action of the mill 13 cleans the matter off and the discharged deposited on the conveyor 15 is suitable to be returned to the place where it came from after being treated to the mill cleaning process The same result occurs for the material discharged from the cyclone 18 at the conveyor 21. That cleaned material, substantially free of contaminants, is suitable for return to its place of origin. The material carried over to the combustor 30 is treated to a temperature of at least 2000° F., and may go higher depending on the addition of extra oxygen and fuel from the sources of 31 and 33 connected to the burner unit 32. That temperature is sufficiently high to reduce the matter in the bottom of the combustor region 37 to a pastey condition that fuses and converts to pellets prior to being discharged at outlet 41.

The foregoing specification has set forth a preferred embodiment of apparatus for carrying out the cleaning of oil and other contaminants from soil which can be returned for reuse, while the removed contaminants are burned and otherwise reduced to pellet character suitable for landfill purposes.

What is claimed is:

1. In a system for processing soil consisting of solid material and vaporizable substances to separate the solids from the vaporizable substances, the improvement which comprises the steps of:
    (a) in a first operative phase of the system classifying the soil consisting of solids and vaporizable substances into solids substantially free of vaporizable substances and a mixture of fine residue material and vaporizable substances;
    (b) in a second operative phase subjecting the vaporizable substances and fine residue material to a combustion step to utilize the vaporizable substances as a fuel to at least partly support the combustion and continuing the combustion step in the presence of heated ambient air to fuse the residue material from the combustion into a stabilized pellet form; and
    (c) utilizing a portion of the heat from the combustion step to promote initial vaporization of the vaporizable substances in the first operative phase of the system.

2. In the system of claim 1, the step in the second operative phase of collecting the residue material resulting from combustion in a sub-region of the combustor to subject the residue material to heated ambient air to create a turbulent zone of combustion to fuse the residue material into a substantially stable, solid and deoderized pellet form.

3. In a system for processing waste material contaminated with solid material and vaporizable substances, the improvement which comprises the steps of
    (a) classifying all of the waste material into a: first output consisting of solids relatively free of contaminants, and a mixture of vaporizable substances and fine residue material;
    (b) subjecting the mixture of vaporizable substances and fine residue to a staged disposal step in which
        (1) said mixture is subjected to a first stage combustion under a controlled admission of outside fuel and air for delaying the creation of nitrogen in the combustion,
        (2) continuing the combustion of the mixture in a second stage to produce a high temperature gas and initiate fusing of residue ash while releasing the high temperature gas for promoting the vaporization of the mixture of vaporizable substances and fine residue, and
        (3) subjecting the fusing of the residue ash in a third stage supply of heated outside air to solidify the residue ash into pellets.

* * * * *